(12) United States Patent
Ambardekar et al.

(10) Patent No.: US 9,501,299 B2
(45) Date of Patent: Nov. 22, 2016

(54) MINIMIZING PERFORMANCE LOSS ON WORKLOADS THAT EXHIBIT FREQUENT CORE WAKE-UP ACTIVITY

(71) Applicant: Intel Corporation, Santa Clara, CA (US)

(72) Inventors: Ameya Ambardekar, Hillsboro, OR (US); Avinash N. Ananthakrishnan, Portland, OR (US); Ian M. Steiner, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 73 days.

(21) Appl. No.: 14/306,014

(22) Filed: Jun. 16, 2014

(65) Prior Publication Data

US 2015/0363212 A1 Dec. 17, 2015

(51) Int. Cl.
| G06F 1/00 | (2006.01) |
| G06F 9/445 | (2006.01) |
| G06F 1/32 | (2006.01) |
| G06F 9/48 | (2006.01) |

(52) U.S. Cl.
CPC ............ *G06F 9/44505* (2013.01); *G06F 1/32* (2013.01); *G06F 9/4893* (2013.01)

(58) Field of Classification Search
CPC ........ G06F 1/324; G06F 9/4411; G06F 1/32; G06F 9/44505; G06F 9/4893
USPC .......................... 713/320, 322, 500; 702/186
See application file for complete search history.

(56) References Cited

U.S. PATENT DOCUMENTS

| 8,041,521 B2* | 10/2011 | Bletsch | G06F 1/3203 |
| | | | 702/186 |
| 2007/0255972 A1* | 11/2007 | Gaskins | G06F 1/206 |
| | | | 713/500 |
| 2012/0054519 A1* | 3/2012 | Branover | G06F 1/3203 |
| | | | 713/322 |
| 2012/0102345 A1* | 4/2012 | Park | G06F 1/3215 |
| | | | 713/322 |
| 2013/0111226 A1* | 5/2013 | Ananthakrishnan | G06F 1/26 |
| | | | 713/300 |
| 2013/0246820 A1* | 9/2013 | Branover | G06F 1/3296 |
| | | | 713/320 |
| 2013/0346774 A1* | 12/2013 | Bhandaru | G06F 1/3234 |
| | | | 713/320 |
| 2015/0149800 A1* | 5/2015 | Gendler | G06F 1/324 |
| | | | 713/322 |

* cited by examiner

*Primary Examiner* — Aurel Prifti
(74) *Attorney, Agent, or Firm* — Thomas R. Lane

(57) ABSTRACT

A processor may include a cause agnostic frequency dither filter (FD filter), which may cause reduction in the frequency transitions while maintaining the performance levels. The FD Filter may minimize the performance loss, which may otherwise accrue from these frequency transitions, while trying to maximize the peak frequency of the processor. The FD filter may determine a minimum and maximum limit, which may be used by a power management unit (PMU) to restrict the number of frequency transitions to be within a specified threshold. The FD filter may determine the maximum and minimum limits based on transition data stored in internal tables captured during one or more time windows (or observation windows). Based on an average system behavior, the PMU may either apply the minimum or the maximum limit over the subsequent time window.

21 Claims, 7 Drawing Sheets

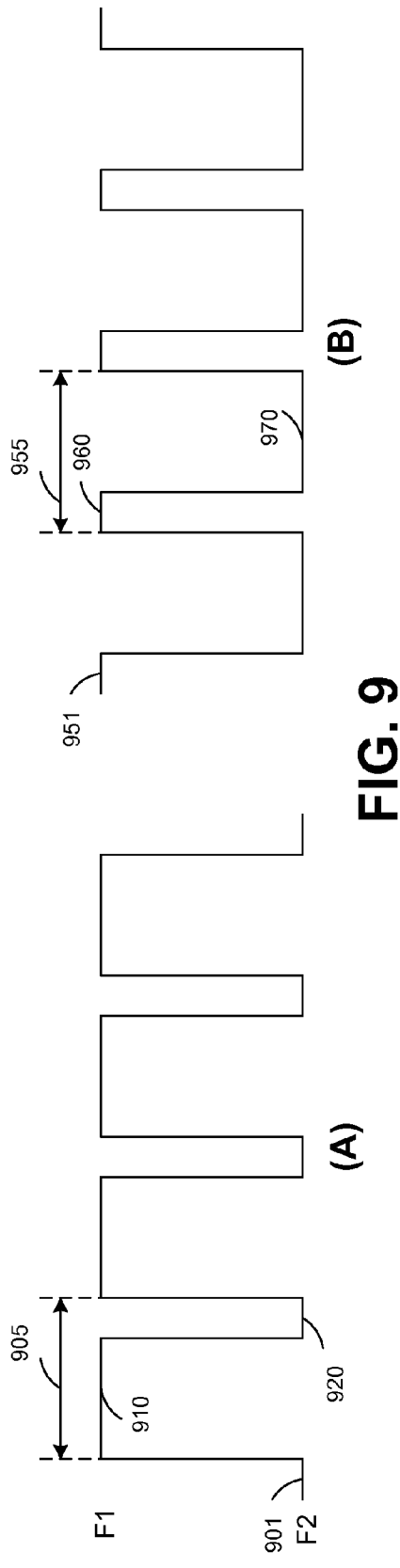

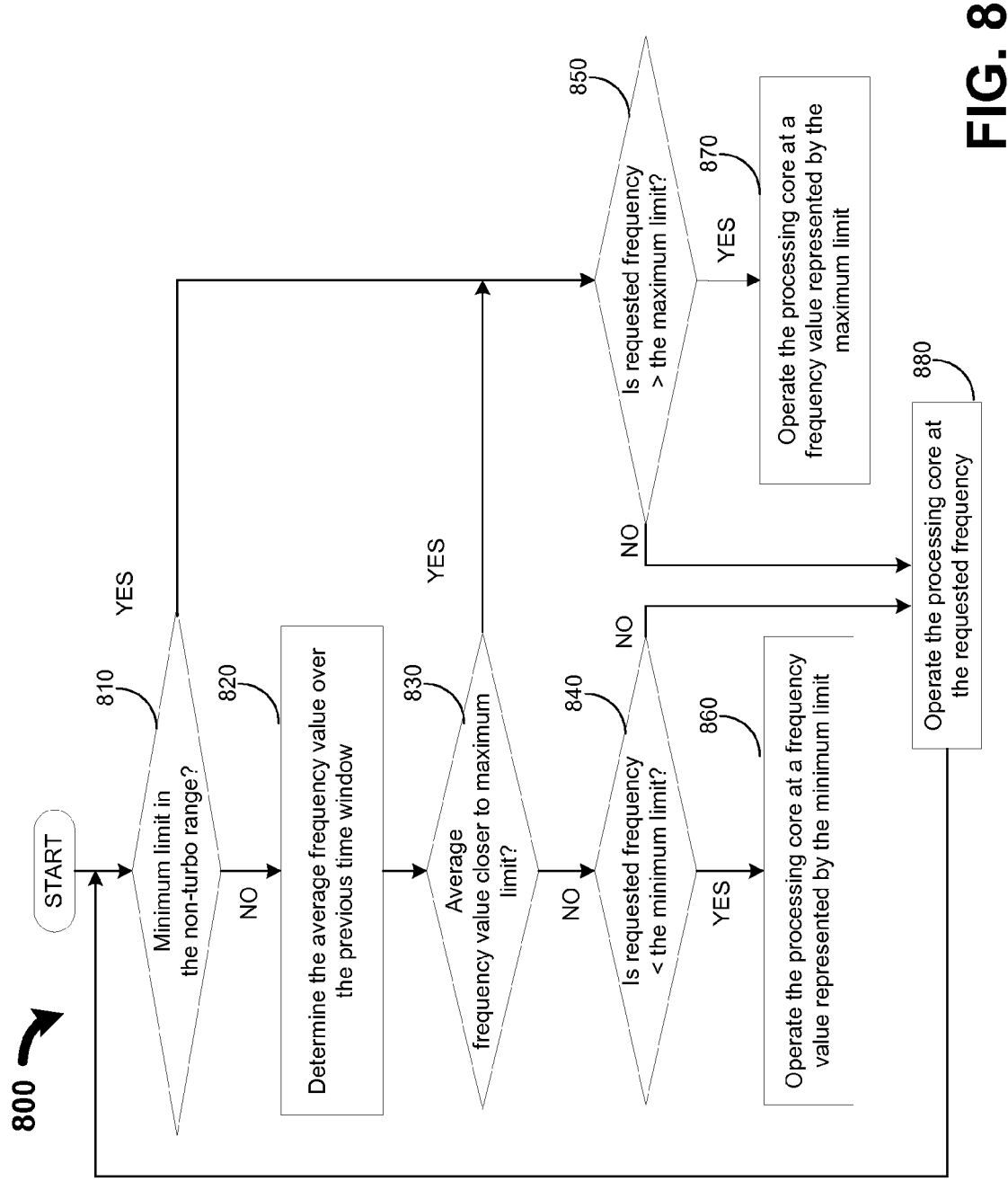

MINIMIZING PERFORMANCE LOSS ON WORKLOADS THAT EXHIBIT FREQUENT CORE WAKE-UP ACTIVITY

FIELD OF THE INVENTION

This disclosure pertains to minimizing performance loss on workloads that exhibit frequent core wake-up activity and in particular but not exclusively, minimize the performance loss on workloads that exhibit frequent core wake-up activity based on the number of active cores in a voltage-frequency domain and the highest frequency at which an active core operates.

BACKGROUND

Many modern day processors are often built with many processing cores (or compute elements) and these processing cores may share a same voltage-frequency domain or may be spread across different voltage-frequency domains ("domains" hereafter). These domains (and in turn the processing cores in that domain) are provided with voltage-frequency levels (combination of voltage and frequency values referred to as "operating points", hereafter). Generally, an operating system is responsible for requesting an operating point for each domain based on the workloads or activity levels or some other such parameters. Choosing different operating points based on the workloads or activity levels or any other such parameter may provide power-performance efficiency to the processors. After receiving a request for a particular operating point, a power management unit may examine whether parameters such as peak current, power, and thermal limits can be met if such operating points (or frequency change requests if only a change in frequency is requested while maintain voltage at a particular level) are accommodated. Each frequency transition causing a decrease in the frequency provided to the domains may provide an opportunity to save power. However, the performance penalty associated with frequent frequency transitions may overweigh the advantages derived from power savings if the number of frequency transitions exceed a particular level.

BRIEF DESCRIPTION OF THE DRAWINGS

The embodiments of the invention described herein are illustrated by way of examples and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 6 is a table, which illustrates determination of an example maximum limit in accordance with one embodiment.

FIG. 7 is a table, which illustrates determination of an example minimum frequency limit in accordance with one embodiment FIG. 8 is a flow-chart, which illustrates the operation of a power management unit to minimize the frequency translations based on the maximum and minimum frequency limits in accordance with one embodiment.

FIG. 9 illustrates a frequency transition diagram in which frequency transitions are reduced based on a maximum and minimum frequency limit in accordance with one embodiment.

DETAILED DESCRIPTION

Figure 1:
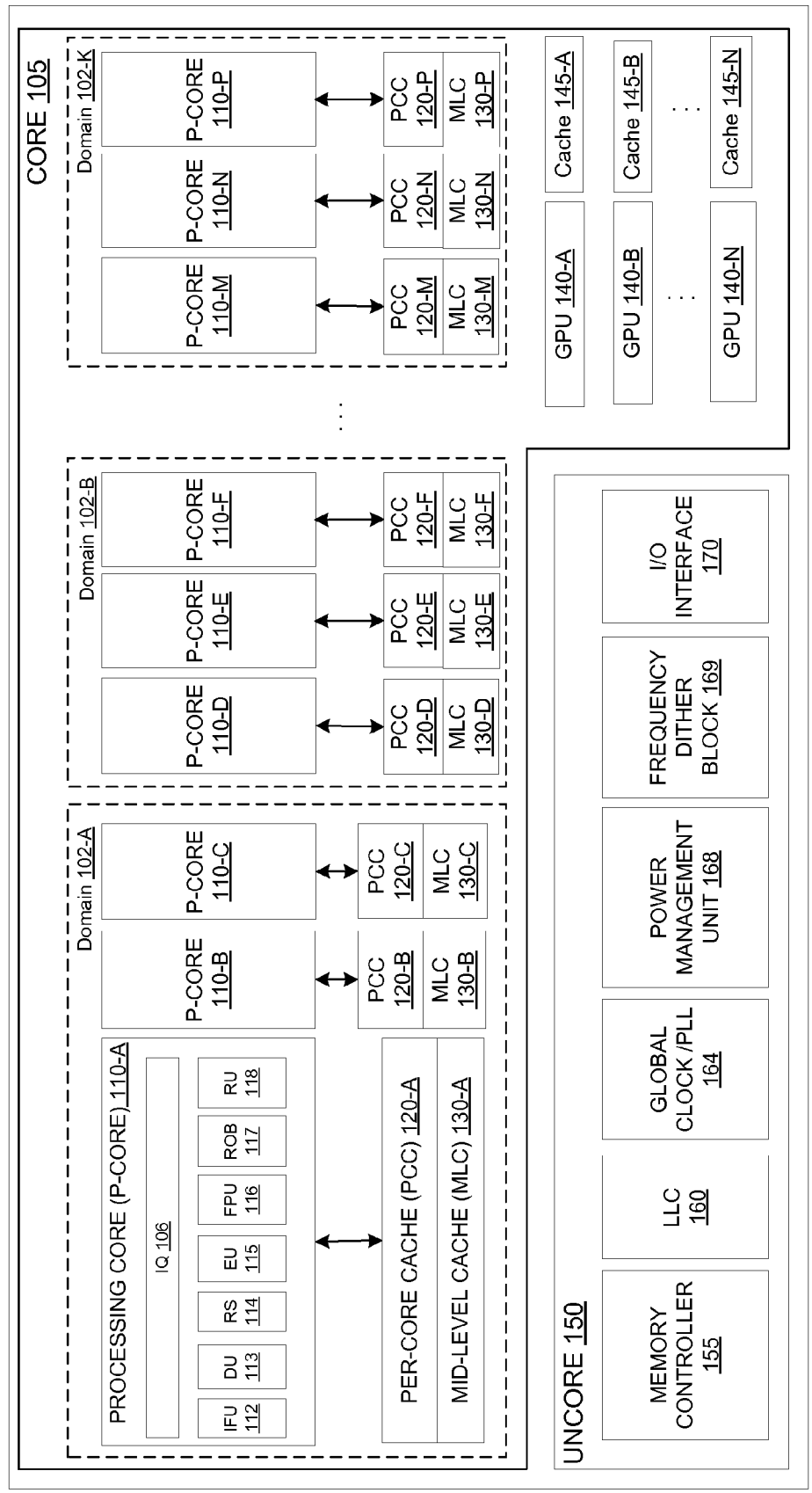
FIG. 1 illustrates a processor 100, which may minimize performance loss on workloads that exhibit frequent core wake-up activity in accordance with an embodiment.

The following description describes embodiments, which may minimize performance loss on workloads that exhibit frequent core wake-up activity. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; flash memory devices; electrical, optical, acoustical or other similar signals. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

Many modern day processors often choose to have multiple cores that share the same voltage-frequency domain. Generally, an operating system (OS) is responsible for requesting a frequency for each core. In response to receiving such frequency requests, a power management unit (PMU) may determine whether the system constraints like peak current, sustained power, and thermal limits are met and assign a consolidated working frequency and voltage (operating point) to the domain. Consolidated operating point may be assigned to a domain as cores, which share a voltage-frequency domain, may need to change frequency when another core in the same domain changes sleep state. There may be a number of factors such as platform power delivery limits and the number of active cores in a domain that necessitate such frequency changes. Platform power delivery limits may determine whether the frequency transitions may be supported. Further, the maximum turbo frequency that a die can run at is dependent on the number of active cores. Higher the number of active cores, the more peak current/power delivery a platform needs to support. In other words, for a given platform capability, the peak frequency a processor can run at depends on the number of compute elements (or cores) active at a given point in time. Further, another factor that has a bearing on whether frequency transitions may be allowed or not is that a shared voltage-frequency domain should run at the frequency of the fastest core even though all the cores in the same voltage-frequency domain may not be required to run at the frequency of the fastest core.

As a result, workloads that cause individual cores to go in and out of sleep can necessitate a frequency change on every core's sleep to active transition. Depending on the nature of the workload, if the rate of change of cores' state going from active to sleep is high, the number of frequency transitions that are required to comply within platform's physical constraints may also be high. These frequency transitions may occur without the OS's knowledge and result in large power/performance inefficiency due to the time wasted during the transitions. While fewer number of cores are active, the processor can run at a higher frequency and voltage (operating point) and still stay within the physical bounds the platform can support. Some approaches to overcome the power/performance issues contributed to by the frequency transitions include imposing a peak turbo frequency limit to minimize the number of frequency transitions. However, the peak turbo frequency may not be the best option to run the processors at enhanced efficiency levels. Further, imposing a peak turbo frequency may not handle cases where frequency transitions were caused by cores waking up and going to sleep but not wanting to run at turbo frequencies. Also, some approaches have attempted to minimize frequency transition overhead by only imposing a clamp (ceiling limit) on the highest turbo frequency allowed and such approaches do not attempt to minimize frequency transitions if the OS requested operating frequency is not in the turbo region.

To minimize the impact on power-performance efficiencies, embodiments described here include a frequency dither filter (FD filter), which may cause reduction in the frequency transitions while maintaining the performance levels. In one embodiment, the frequency dither filter (FD Filter) block may be provided in a processor that may minimize the performance loss, which may otherwise accrue from these frequency transitions, while trying to maximize the peak frequency of the processor. In one embodiment, the FD filter may be cause agonistic, i.e., the FD filter may help minimize the wasted energy of frequency transitions regardless of the source that caused the frequency transitions.

In one embodiment, the FD filter may determine a minimum and maximum frequency limit, which may be used by a power management unit to restrict the number of frequency transitions to be less than a specified threshold (FTT). In one embodiment, the FD filter may determine these limits based on transition data stored in internal tables captured during one or more time windows (or observation windows). Based on an average system behavior, the PMU may either apply the minimum or the maximum limit over the subsequent time window. In one embodiment, the frequency dither (FD) filter may (1) track average frequency over the course of the workload (or time window) and may pick between a floor (lowest frequency allowed) and a ceiling (highest frequency) allowed; and (2) factor-in frequency transitions irrespective of the range in which the frequency transition happened or the cause that triggered the frequency transition. In one embodiment, The FD filter may track two limits—the maximum (max) and the minimum (min) frequency limits and may determine whether to set the max or min limit based on the average system behavior. In one embodiment, a power management unit (PMU) may receive a signal from the FD filter and based on the signal may either select the maximum limit or a minimum limit for operating the processor.

An embodiment of a processor 100, which may minimize performance loss on workloads that exhibit frequent core wake-up activity in a processor is illustrated in FIG. 1. In one embodiment, the processor 100 may comprise a core area 105 and an uncore area 150. In one embodiment, the core 105 and the uncore 150 may support a point-to-point bi-directional bus to communicate between the processing cores (p-cores) 110-A to 110-N, GPUs 140-A and 140-N and between the core area 105 and the uncore area 150. In one embodiment, the core area 105 may be divided into various voltage-frequency domains such as domain 102-A to 102-K. For example, the voltage-frequency domain 102-A may include processing cores 110-A, 110-B, and 110-C, the domain 102-B may include processing cores 110-D, 110-E, and 110-F, and domain 102-K may include processing cores 110-M, 110-N, and 110-P. In one embodiment, the frequency of the clock signal provided to the processing cores 110-A to 110-C of domain 102-A may depend on the number of active processing cores 110 in the domain 102-A and the frequency of the clock signal provided to the fastest active core 110. For example, the frequency provided to processing cores 110-A to 110-C may be F1 if the cores 110-A and 110-C are active and if the fastest active core is 110-A. However, the frequency may transition to F2 if the active core 110-C transitions to a sleep state or if the workload on the fastest active core 110-A changes or if both the conditions occur. In one embodiment, in the absence of a FD filter 169, several frequency transitions such as a frequency transition F1 and F2 may occur too frequently and independently of the requests from the operating system. In one embodiment, as described below, the FD filter 169 and the power management unit 168 may together limit such frequency transitions to reduce the performance losses, which may occur due to frequent frequency transitions.

In one embodiment, the core area 105 may comprise processing cores such as p-cores 110-A to 110-N, per-core caches 120-A to 120-N and mid-level caches 130-A to 130-N associated with the p-cores 110-A to 110-N. In one embodiment, the p-cores 110 may include an instruction queue 106, an instruction fetch unit IFU 112, a decode unit 113, a reservation station RS 114, an execution unit EU 115, a floating point execution unit FPU 116, a re-order buffer ROB 117, and a retirement unit RU 118. In one embodiment, each processor core 110-B to 110-N may each include blocks that are similar to the blocks depicted in the processing core 110-A and the internal details of each of the processing cores 110-B to 110-N is not shown for brevity. The cores 110-A to 110-N may be homogenous or heterogeneous in terms of architecture and/or instruction set. For example, some of the cores 110-A to 110-N may be in order while others are out-of-order. As another example, two or more of the cores 110-A to 110-N may be capable of execution of the same instruction set such as X86 or reduced instruction set architecture (RISC) instructions, while others may be capable of executing only a subset of that instruction set or a different instruction set. Further, the cores 110-A to 110-N may include a combination of big-little cores with different processing and power consumption capabilities. In one embodiment, the per-core caches 120 may include memory technologies that may support higher access speeds, which may decrease the latency of instruction and data fetches, for example. In one embodiment, the core area 105 may include one or more graphics processing units (GPUs) 140-A to 140-N. In one embodiment, the sub-blocks within each of the GPU 240 may be designed to perform video processing tasks, which may include video pre-processing and video post-processing tasks.

In one embodiment, the uncore area 150 may include a memory controller 155, LLC 160, a global clock/PLL 164, a power management unit 168, and an I/O interface 170. In one embodiment, the I/O interface 170 may provide an interface to I/O devices such as the keyboard, mouse, camera, display devices, and such other peripheral devices. In one embodiment, the I/O interface 170 may support, electrical, physical, and protocol interfaces to the peripheral devices. In one embodiment, the I/O interface 170 may include network interfaces and display interfaces to, respectively, provide an interface to a network and a display device.

In one embodiment, the memory controller 155 may interface with the memory devices such as the hard disk and solid state drives. In one embodiment, the global clock/PLL 164 may provide clock signals to different portions or blocks of the computing platform 100. In one embodiment, the portions may be formed based on, for example, the voltage planes and power planes and the clock these blocks or portions may be controlled by the power management unit 168 based on the workload, activity, temperature, or any other such indicators. The power management unit 168 may implement power management techniques such as dynamic voltage and frequency scaling, power gating, turbo mode, throttling, clock gating, and such other techniques.

In one embodiment, the frequency dither (FD) filter 169 may reduce frequency transitions while maintaining the performance levels. In one embodiment, the FD filter 169 may accept two inputs namely a time window TW and maximum allowable frequency value FTmax and generate a maximum limit and a minimum limit. In one embodiment, the FD filter 169 may determine these limits based on transition data stored in internal tables (described in detail below) captured during a current time window (or observation windows). Based on an average system behavior, either the minimum or the maximum limit may be applied over a subsequent time window.

In one embodiment, the FD filter 169 may (1) track average frequency over the course of the workload (or time window) and may pick between a floor (lowest frequency allowed) and a ceiling (highest frequency) allowed; and (2) factor-in frequency transitions irrespective of the range in which the frequency transition happened or the cause that triggered the frequency transition. In one embodiment, the FD filter 169 may examine the frequency transitions occurring in the system and help the PMU 168 impose a maximum or minimum frequency limit on the processing cores. In one embodiment, the FD filter 169 may track two limits—the maximum (max) and the minimum (min) frequency limits and may determine whether to set the max or min limit based on the average system behavior.

Figure 2:
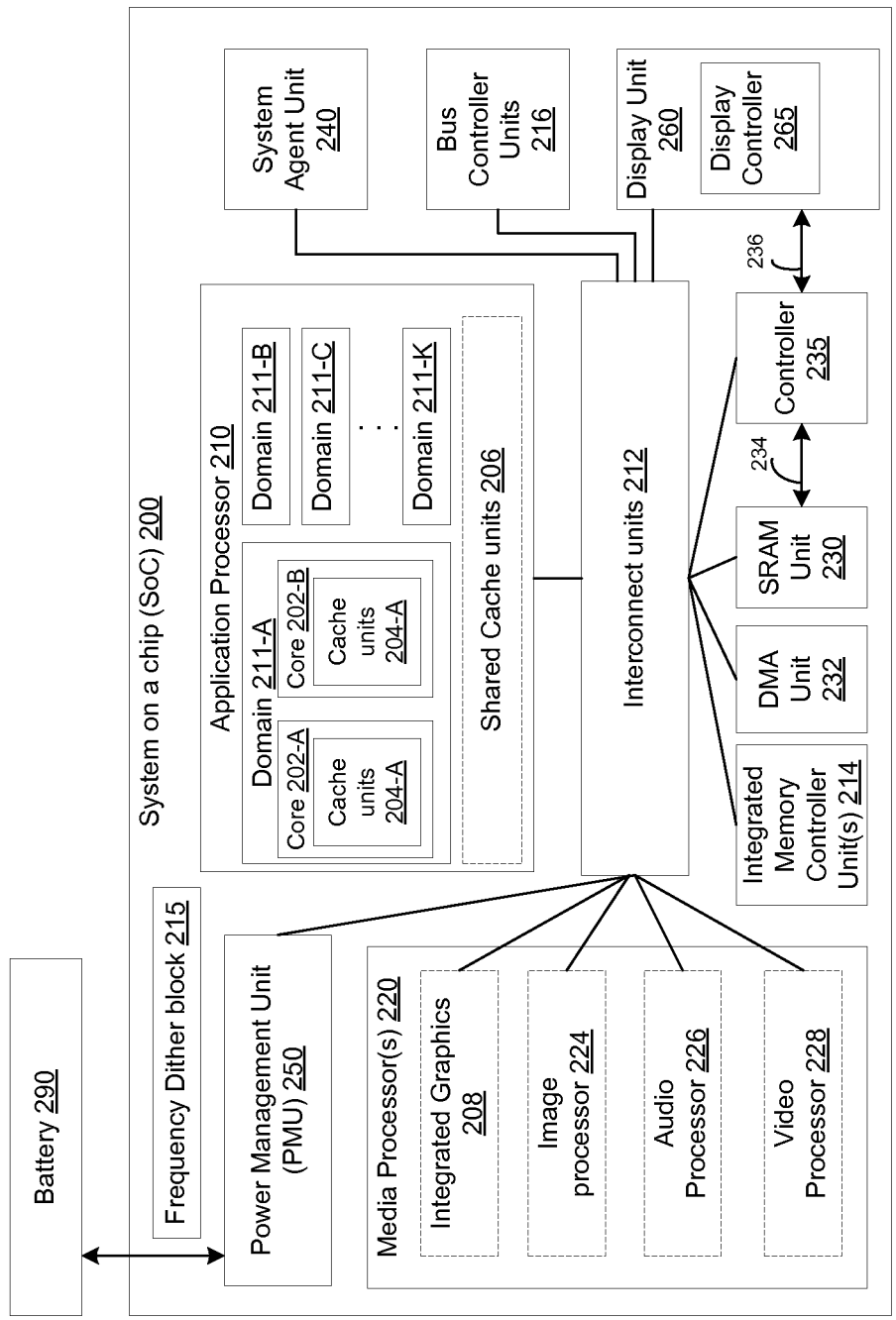
FIG. 2 illustrates a system-on-chip (SoC) 200, which may minimize performance loss on workloads that exhibit frequent core wake-up activity in accordance with an embodiment.

An embodiment of a system-on-chip (SoC) 200, which may support one or more techniques to minimize performance loss caused due to frequent frequency transitions is illustrated in FIG. 2. In one embodiment, the SoC 200 may include a single core or a multi-core application processor 210, interconnect unit(s) 212, integrated memory controller unit(s) 214, bus controller unit(s) 216, media processors 220, SRAM units 230, DRAM units 232, controller 235, system agent 240, power management unit 250, and a display unit 260. In one embodiment, multiple processing cores may be distributed among several voltage-frequency domains such as domains 211-A to 211-K. For example, the domain 211-A may include cores 202-A and 202-B. In one embodiment, the each domain 211 may operate at different voltage and frequency levels based on the number of cores that are active at a given point in time and highest frequency at which at least one of the active processing cores operate. In one embodiment, the frequency transitions for each domain 211 may be limited by a maximum limit and a minimum limit. In one embodiment, a frequency dither (FD) filter 215 may determine the maximum and minimum limit. In one embodiment, the PMU 250 and the FD filter 215 may work cooperatively to allow frequency transitions to occur only if the frequency value is within a range bounded by the minimum and maximum limit.

The processor 210 and 220 may be a general-purpose processor, such as a Core™ i3, i5, i7, 2 Duo and Quad, Xeon™, Itanium™, XScale™, Atom™ or StrongARM™ processor, which are available from Intel Corporation, of Santa Clara, Calif. Alternatively, the processor may be from another company, such as ARM Holdings, Ltd, MIPS, Advanced Micro Devices etc. The processor may be a special-purpose processor, such as, for example, a network or communication processor, compression engine, graphics processor, co-processor, embedded processor, or the like. The processor may be implemented on one or more chips. The processors 210 and 220 may be a part of and/or may be implemented on one or more substrates using any of a number of process technologies, such as, for example, BiCMOS, CMOS, or NMOS.

The SoC 200 may be used in system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

In FIG. 2, an interconnect unit(s) 212 is coupled to: an application processor 210 which includes a set of one or more cores 202A-N and shared cache unit(s) 206; a system agent unit 240; a bus controller unit(s) 216; an integrated memory controller unit(s) 214; a set or one or more media processors 220, which may include integrated graphics logic 208, an image processor 224 for providing still and/or video camera functionality, an audio processor 226 for providing hardware audio acceleration, and a video processor 228 for providing video encode/decode acceleration; a static random access memory (SRAM) unit 230; a direct memory access (DMA) unit 232; and a display unit 260, which may include one or more display controller(s) 265 for controlling one or more external displays, and a controller 235. In one embodiment, the controller 235 may be a mini or a micro controller and it may be designed to consume substantially low power. In one embodiment, even the battery in its critical (or minimal) charged state may support the power consumption of the controller 235.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect units 212 interconnects the integrated graphics logic 208, the set of shared cache units 206, and the system agent unit 240, alternative embodiments may use any number of well-known techniques for interconnecting such units. In some embodiments, one or more of the cores 202 are capable of multi-threading.

The cores 202 may be homogenous or heterogeneous in terms of architecture and/or instruction set. For example, some of the cores 202-A and 202-B may be in order while others are out-of-order. As another example, two or more of the cores 202 may be capable of execution of the same instruction set, while others may be capable of executing only a subset of that instruction set or a different instruction set. Further, the cores 202 may include a combination of big and little cores with different processing and power consumption capabilities.

In one embodiment, the system agent 240 may include those components for coordinating and operating cores 202. In one embodiment, the system agent unit 240 may include, for example, a power management unit (PMU) 250 and a display unit 260. The PMU 250 may include logic and components needed for regulating the power state of the cores 202 and the integrated graphics logic 208. The display unit 260 is for driving one or more externally connected displays. In other embodiments, the PMU 250 and display unit 260 may be provided outside the system agent 240 as depicted in FIG. 2. In one embodiment, the PMU 250 may be coupled to a battery 290 and the PMU 250 may keep checking the charge on the battery 290.

In one embodiment, the FD filter 215 may determine a minimum and maximum limit as described below. In one embodiment, the PMU 250 may limit the number of frequency transitions to be within a range based on the minimum and maximum limit. As a result, the performance loss in the SoC 200 may be minimized. In one embodiment, the PMU 250 may provide control signals to the controller 235 and the controller 235 may perform appropriate actions based on the control signals. In one embodiment the controller 235 under the control of the PMU 235 may implement techniques such as voltage and frequency throttling, dynamic voltage and frequency scaling (DVFS), instruction throttling, selective and independent power control to multiple cores, change in system sleep states and core sleep states and such other techniques to control power to various portions of the SoC 200.

Figure 3:
FIG. 3 illustrates a frequency dither filter 300, which may generate maximum and minimum frequency limits to reduce the frequency transitions in accordance with one embodiment.

An embodiment of a FD filter 300, which may generate minimum and maximum limit values is illustrated in FIG. 3. In one embodiment, the FD filter 300, may receive two inputs namely the time window TW_310 (as indicated in block 410 of FIG. 4) and a frequency transitions threshold value FTT 320 (as indicated in block 430 of FIG. 4). In one embodiment, the time window TW_310 may be determined based on the expected responsiveness and the level of jitters that can be allowed. In one embodiment, a longer duration of the time period TW_310 may reduce the responsiveness to the changes in the workload however, the jitters may be reduced. In one embodiment, the input TW_310 may be tuned to balance the responsiveness and jitter requirements. In one embodiment, the large value of FTT 320 may result in a more relaxed minimum and maximum limit, however, as FTT 320 becomes larger there may not be sufficient reduction in the frequency transitions and as described above a large number of frequency transitions may lead to performance losses. In one embodiment, the values of TW_310 and FTT 320 may be determined based on the responsiveness required and the performance losses that may be tolerated.

Figure 4:
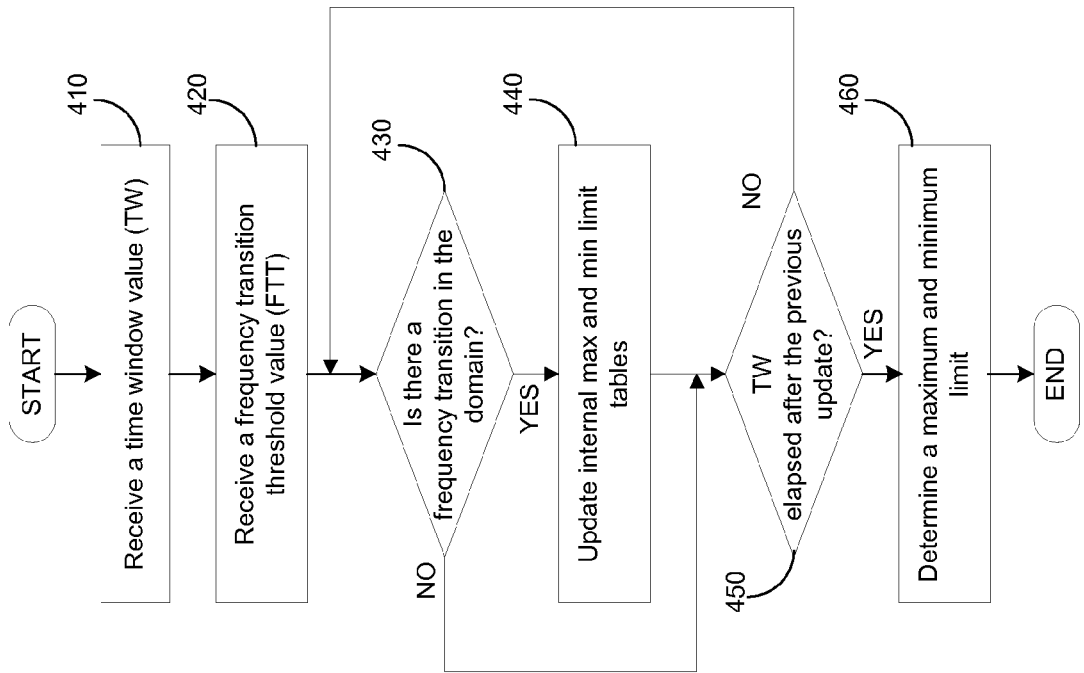
FIG. 4 is a flow-chart, which illustrates the operation of a frequency dither filter in accordance with one embodiment.

A flow-chart illustrating the operation of a frequency dither (FD) filter to generate minimum and maximum limits is illustrated in FIG. 4. In block 410, a FD filter such as FD filter 300 or 215 or 169 may receive a time window (TW) value. In one embodiment, the time window value such as TW_310 may be provided by a user or a processor such as processor 100 or an application processor 210. In one embodiment, time window TW may be selected from a table comprising various time window values. In other embodiments, the time window value may be dynamically determined and provided to the FD filter. As described above, the duration of the time window may be based on the responsiveness required and/or the jitter, which may be tolerated. In other embodiments, the time window value may be determined by the power management unit (PMU) as well.

In block 430, the FD filter may receive an FTT. In one embodiment, the FTT value may be determined by the processor 100 or the application processor 210 or the power management unit such as PMU 168 or 250. As described above, the FTT value may be determined based on the performance loss, which may be tolerated due to frequency transitions.

In block 430, the FD filter may determine whether there is a frequency transition occurring in the domain. In one embodiment, the PCU may determine, based on the changes in the activity levels or workload or any other such changes, whether a frequency transition is required to meet the change in the activity level or workload. In one embodiment, the FD filter may receive a signal from the PCU, which indicates that there may be a frequency transition. In one embodiment, control passes to block 440 if the frequency transition is set to occur and to block 450 otherwise.

In block 440, the FD filter may update the internal max and min limit tables. In one embodiment, the max and min tables are updated as explained below with reference to FIGS. 6 and 7.

In block 450, the FD filter may check if the time window has elapsed and control passes to block 460 if the time window TW has elapsed. In one embodiment, the FD filter may collect information including the number of frequency transitions that may occur during the time window TW, maximum and minimum frequency values and such other values.

In block 460, the FD filter may determine the minimum and maximum limit. In one embodiment, the manner in which the minimum and maximum limits may be determined is described with reference to FIGS. 5, 6, and 7 below. In one embodiment, the maximum limit may represent a ceiling limit frequency value beyond which the processing cores within a domain are not allowed to run. In one embodiment, the maximum limit, effectively, specifies a maximum frequency that all cores in the shared voltage and frequency domain can run. In one embodiment, the minimum limit may represent a floor limit frequency value below which the core is not allowed to run. Effectively, the minimum limit may specify a minimum frequency that all cores in the shared voltage and frequency domain can run. In one embodiment, the TW may be dynamically varied based on the workload conditions. For example, the TW may be increased if the occurrence of frequency transitions in a unit time is lesser than a limit value. In one embodiment, the TW may be decreased if the occurrence of frequency transitions in the unit time is greater than the limit value. In other embodiment, the minimum and maximum limit determined in a present TW may be used in a number of subsequent time windows before the minimum and maximum limits may be determined in a future TW.

Figure 5:
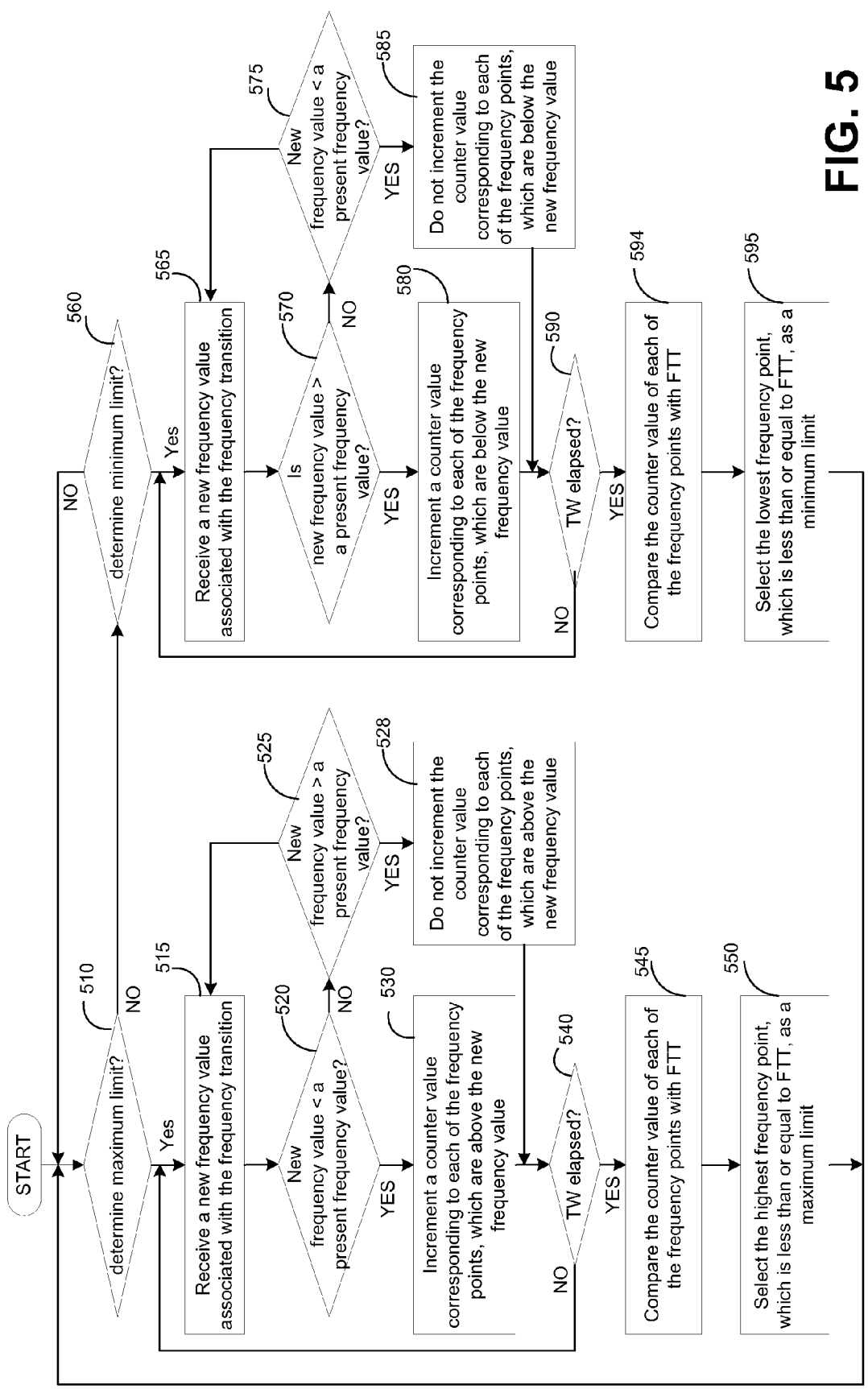
FIG. 5 is a flow-chart, which illustrates an approach adapted by the frequency dither filter to determine a maximum frequency limit and a minimum frequency limit in accordance with one embodiment.

An embodiment of a FD filter configured to determine the minimum and maximum limit is illustrated in FIG. 5. In one embodiment, the blocks 510 to 550 describe a method to determine the maximum limit and blocks 560 to 595 describe a method to determine the minimum limit as described below. In block 510, the FD filter may check whether a maximum limit is being determined and control passes to block 515 if the maximum limit is being determined and to block 560 if a minimum limit is to be determined.

In block 515, the FD filter may receive a new frequency value associated with a frequency transition. In one embodiment, the FD filter may receive new frequency value such as (P1 to P4), or (P4 to P2), or (P2 to P3), for example. In one embodiment, the frequency value Px may be greater than Py if x is less than y.

In block 520, the FD filter may check if the new frequency value is less than a present frequency value and passes control to block 530 if the new frequency value is less than the present value and to block 525 otherwise. For example, the new frequency value received may equal P4 and the present frequency value may be P1. In one embodiment, a first frequency transition from P1 to P4 may be depicted by 665 in FIG. 6. Table 600 of FIG. 6 may include 3 columns 610, 630, and 640. Columns 630, and 640 respectively represent frequency points, after first frequency transition, and after second frequency transition. Table 600 may include rows 661-A to 661-N, which may include weights for each frequency points after each frequency transition is complete.

Block 525 may be reached if the new frequency value is higher than the present frequency value. For example, the present frequency value may be P4 and the new frequency value may be P2 (P2 is higher than P4, as indicated by a second frequency transition 666) and control may reach block 525. In block 525, the FD filter may check if the present frequency value is greater than the new frequency value and control passes to block 528 if the present frequency value is greater than the new frequency value and to block 515 otherwise. In the above example, as P2 is greater than P4, control passes to block 528.

In block 528, the FD filter may not modify the counter value for corresponding to each of the frequency points, which are above the new frequency value. In the above example, the FD filter may not modify the counter values for P3, P2, and P1 frequency points, which are above the new frequency value P4.

In block 530, the FD filter may increment a counter value corresponding to each of the frequency points, which are above the new frequency value. For example, the frequency points P1, P2, and P3 are above the new frequency value P4 and the counter value for P1, P2, and P3 may be incremented. Column 630 of FIG. 6 indicates that the weight or the counter value corresponding to frequency points P1, P2, and P3 are incremented by 1. As a result, the counter value for frequency points P1, P2, and P3 is equal to 1 after the first frequency transition.

In block 540, the FD filter may check if the time window has elapsed and control passes to block 545 if the time window (TW) has elapsed and to block 515 otherwise. In one embodiment, the FD filter may respond to the frequency transitions occurring within the present time window to determine the maximum limit and this maximum limit may be used to limit the number of frequency transitions during the next window and subsequent windows. Such a determination of maximum limit may continue, dynamically, to meet the change in frequency transitions while minimizing the performance loss, which may be caused due to an increased number of frequency transitions.

For example, assuming that the time window has not elapsed, control passes to block 515. In one embodiment, the second frequency transition (P4 to P2, as indicated by 666) may be received by the FD filter and the third frequency transition may indicate a change in frequency from the present value of P4 to a new frequency value of P2. As described above, in block 520, control passes to block 525 and 528 and the counter value may not be incremented as the new frequency value is higher than the present frequency value. In one embodiment, as in block 540, the time window TW may not be elapsed yet and control passes to block 515.

For example, in one embodiment, the next or the third frequency transition (P2 to P3 indicated by 667) may be received (as indicated in block 515) and control passes to block 520. In block 520, P3 is compared with P2 and control passes to block 530 as P3 is less than P2 and the counter value of all the frequency points (i.e., P1 and P2, which are above P3) may be incremented by 1. Thus, the counter value for the frequency points P1 and P2 is 2 as shown in rows 661-A and 661-B of column 640. Then control passes to block 540 and assuming that time window TW has elapsed control passes to block 545.

In block 545, the FD filter may compare the counter value (or weights) of each of the frequency points with the FTT. For example, the FD filter may be provided with a FTT of 1 and the counter values of (2 for frequency point P1, 2 for frequency point P2, and 1 for frequency point P3) may be compared with FTT. In block 550, the FD filter may select the highest frequency point, which is less than or equal to FTT. In the above example, the frequency points P1 and P2 have registered a counter value of 2 and are greater than the FTT, thus the highest frequency point, which is equal to FTT (of 1) is P3 as the counter value of P3 is 1. Thus, the maximum limit may be selected as P3.

In block 560, the FD filter may check whether a minimum limit is to be determined and control passes to block 565 if the minimum limit is to be determined and to block 510 otherwise. In block 565, the FD filter may receive a new frequency value associated with a frequency transition. In one embodiment, the FD filter may receive new frequency value such as (Pn to Pn−2) or (Pn−2 to Pn−3), for example. In one embodiment, the frequency value Pn−3 may be greater than Pn−2 and Pn−2 may be greater than Pn.

In block 570, the FD filter may check if the new frequency value is greater than a present frequency value and control passes to block 580 if the new frequency value is greater than the present value and to block 575 otherwise. For example, the new frequency value received may equal Pn−2 and the present frequency value may be Pn. In one embodiment, a fourth frequency transition from Pn to Pn−2 may be depicted by 765 in FIG. 7. Table 700 of FIG. 7 may include 3 columns 710, 730, and 740. Columns 730, and 740 respectively represent frequency points, after the fourth frequency transition, and after the fifth frequency transition. Table 700 may include rows 761-A to 761-N, which may include weights for each frequency points after each frequency transition is complete.

Block 575 may be reached if the new frequency value is lesser than the present frequency value. In block 585, the FD filter may not increment the counter value corresponding to each of the frequency points, which are below the new frequency value.

Block 580 may be reached if the new frequency value is greater than the present frequency value. In the example above, as indicated by 765, Pn−2 is greater than Pn thus, control reaches block 580. In block 580, the FD filter may increment a counter value corresponding to each of the frequency points, which are below the new frequency value. For example, the frequency points Pn and Pn−1 are below the new frequency value Pn−2 and the counter value for Pn and Pn−1 may be incremented by 1. Column 730 of FIG. 7 indicates that the weight or the counter value corresponding to frequency points Pn and Pn−1 are incremented by 1. As a result, the counter value for frequency points Pn and Pn−1 is equal to 1 after the fourth frequency transition 765.

In block 590, the FD filter may check if the time window has elapsed and control passes to block 594 if the time window (TW) has elapsed and to block 565 otherwise. In one embodiment, the FD filter may respond to the frequency transitions occurring within the present time window to determine the minimum limit and this minimum limit may be used to limit the number of frequency transitions during the next window and/or subsequent windows. Such a determination of minimum limit may continue, dynamically, to meet the change in frequency transitions while minimizing the performance loss, which may be caused due to an increased number of frequency transitions.

For example, assuming that the time window has not elapsed, control passes to block 565. In one embodiment, the fifth frequency transition (Pn−2 to Pn−3, as indicated by 766) may be received by the FD filter and the fifth frequency transition may indicate a change in frequency from the present value of Pn−2 to a new frequency value of Pn−3. As described above, in block 570, control again passes to block 580 and the counter values for Pn, Pn−1, and Pn−2 may be incremented by 1 to, respectively, result in a counter value of 2, 2, and 1. The updated counter values are as shown in rows 761-E, 761-M, and 761-N of column 740. Then control passes to block 590 and assuming that time window TW has elapsed control passes to block 594.

In block 594, the FD filter may compare the counter value (or weights) of each of the frequency points with the FTT. For example, the FD filter may be provided with a FTT of 1 and the counter values of (2 for frequency point Pn, 2 for frequency point Pn−1, and 1 for frequency point Pn−2) may be compared with FTT. In block 595, the FD filter may select the lowest frequency point, which is equal to FTT. In the above example, the frequency points Pn and Pn−1 have registered a counter value of 2 and are greater than the FTT, thus the lowest frequency point, which is equal to FTT (of 1) is Pn−2 as the counter value of Pn−2 is 1. Thus, the minimum limit is Pn−2.

An embodiment of a power control unit (PCU) configured to minimize the number of frequency transitions based on the minimum and maximum limit is illustrated in FIG. 8. In one embodiment, FIG. 8 depicts the process of choosing between the minimum and the maximum limits and the application of the selected limit. In block 810, the PCU may check whether the minimum limit is in the turbo range and passes control to block 850 if the frequency value is in the turbo range and to block 820 otherwise. In block 820, the PCU may determine the average frequency over the previous time window. The PCU may compute two limits, minimum and maximum so as to choose the one that is more suitable to be selected as a limit. FIG. 9 shows an example of two of the possible different configurations in which a domain's frequency might dither between two frequency levels F1 and F2 (F1>F2). In FIG. 9A, the domain dithers while being at frequency F1 for a larger fraction of time. Within one single period of dither (905), the domain stays at frequency F1 for a larger time (910) compared to the time in frequency F2 (920 and 901). For this case, the average frequency may be closer to the minimum limit (at F1) to avoid the dither. Similarly, in FIG. 9B, the domain dithers while being at frequency F2 for a larger fraction of time. Within one single period of dither (955), the domain stays at frequency F2 for a larger time (970) compared to the time in frequency F1 (951 and 960). For this case, the average frequency would be closer to the maximum limit (at F2) to avoid the dither.

In block 830, the PCU may check whether the average frequency is closer to the maximum limit compared to the minimum limit, and control passes to block 850 if the average frequency is closer to the maximum limit and to block 840 otherwise. In block 840, the PCU may check if the requested frequency is lesser than the minimum limit and passes control to block 860 if the requested frequency is below the minimum limit and to block 880 otherwise. Similarly, in block 850 the PCU may check if the requested frequency is larger than the maximum limit and passes control to block 870 if the frequency is larger and to block 880 otherwise. In block 860, the PCU may limit the requested frequency to the minimum limit. Similarly, in block 870, the PCU may limit the frequency to the maximum limit. In block 880, the PCU may allow running the processing core at the requested frequency without and minimum and maximum limit restrictions.

Figure 10:
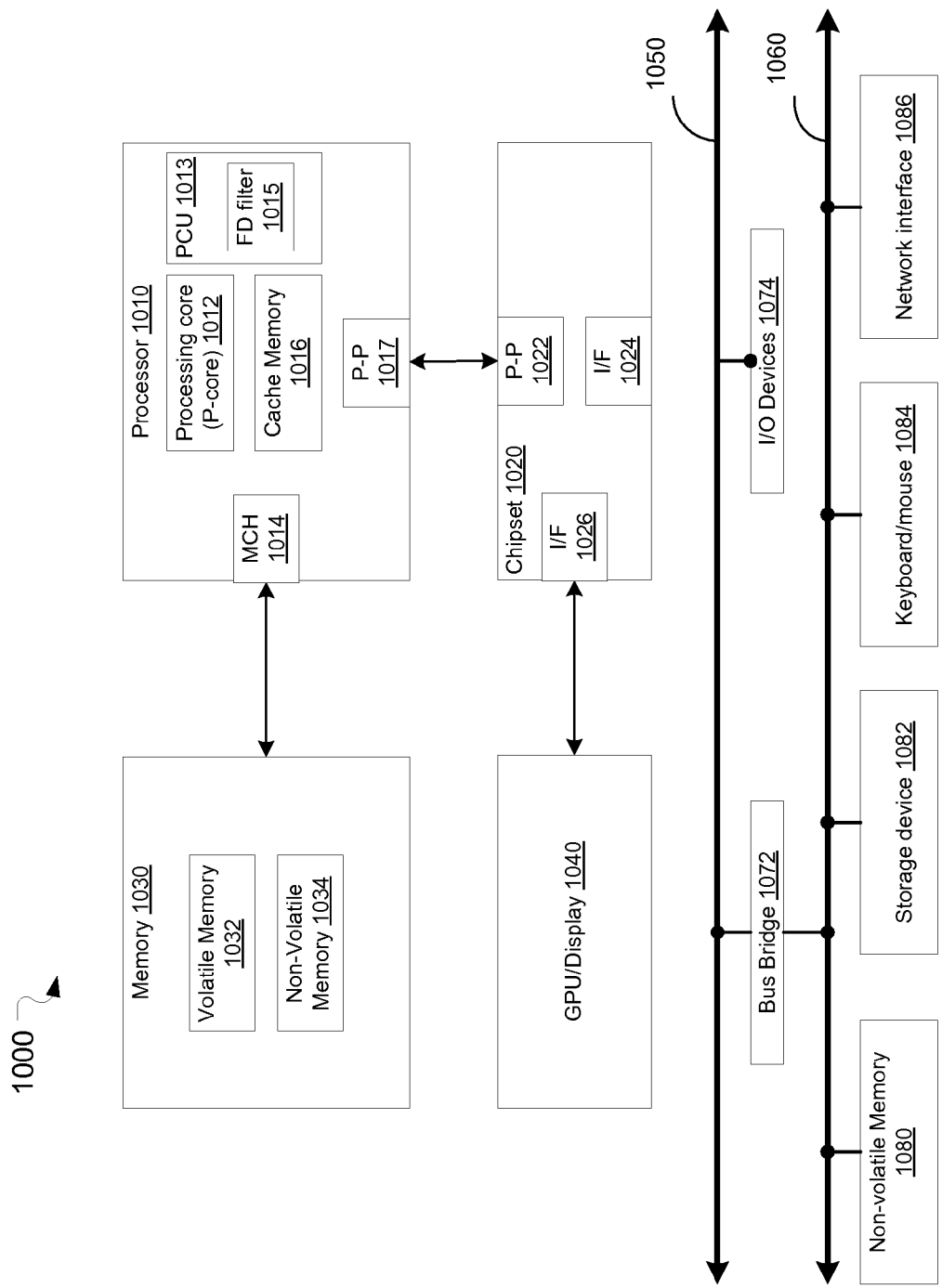
FIG. 10 illustrates a computer system, which may minimize performance loss on workloads that exhibit frequent core wake-up activity in accordance with an embodiment.

FIG. 10 illustrates a system or platform 1000 to implement the techniques disclosed herein in accordance with an embodiment of the invention. The system 1000 includes, but is not limited to, a desktop computer, a tablet computer, a laptop computer, a netbook, a notebook computer, a personal digital assistant (PDA), a server, a workstation, a cellular telephone, a mobile computing device, a smart phone, a wearable device, an Internet appliance or any other type of computing device. In another embodiment, the system 1000 used to implement the methods disclosed herein may be a system on a chip (SOC) system.

The processor 1010 has a processing core (P-core) 1012 to execute instructions of the system 1000. The processing core 1012 includes, but is not limited to, fetch logic to fetch instructions, decode logic to decode the instructions, execution logic to execute instructions and the like. The processor 1010 has a cache memory 1016 to cache instructions and/or data of the system 1000. In another embodiment of the invention, the cache memory 1016 includes, but is not limited to, level one, level two and level three, cache memory or any other configuration of the cache memory within the processor 1010. In one embodiment, the processor 1010 has a central power management unit PMU 1013, which may also include a FD filter 1015. However, in other embodiments, the FD filter 1015 may be provided as a separate block outside the PMU 1013.

In one embodiment, the PMU 1013 in combination with the FD filter 1015 may minimize the frequency transitions based on the maximum and minimum limit. In one embodiment, limiting the frequency transitions may minimize the performance loss, which may otherwise occur due to frequent frequency transitions. In one embodiment, the PMU 1013 may operate as described above with reference to FIGS. 3 to 8.

The memory control hub (MCH) 1014 performs functions that enable the processor 1010 to access and communicate with a memory 1030 that includes a volatile memory 1032 and/or a non-volatile memory 1034. The volatile memory 1032 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 1034 includes, but is not limited to, NAND flash memory, phase change memory (PCM), read only memory (ROM), electrically erasable programmable read only memory (EEPROM), or any other type of non-volatile memory device.

The memory 1030 stores information and instructions to be executed by the processor 1010. The memory 1030 may also store temporary variables or other intermediate information while the processor 1010 is executing instructions. The chipset 1020 connects with the processor 1010 via Point-to-Point (PtP) interfaces 1017 and 1022. The chipset 1020 enables the processor 1010 to connect to other modules in the system 1000. In another embodiment, the chipset 1020 is a platform controller hub (PCH). In one embodiment, the interfaces 1017 and 1022 operate in accordance with a PtP communication protocol such as the Intel® QuickPath Interconnect (QPI) or the like. The chipset 1020 connects to a GPU or a display device 1040 that includes, but is not limited to, liquid crystal display (LCD), cathode ray tube (CRT) display, or any other form of visual display device. In another embodiment, the GPU 1040 is not connected to the chipset 1020 and is part of the processor 1010 (not shown).

In addition, the chipset 1020 connects to one or more buses 1050 and 1060 that interconnect the various modules 1074, 1080, 1082, 1084, and 1086. Buses 1050 and 1060 may be interconnected together via a bus bridge 1072 if there is a mismatch in bus speed or communication protocol. The chipset 1020 couples with, but is not limited to, a non-volatile memory 1080, a mass storage device(s) 1082, a keyboard/mouse 1084 and a network interface 1086. The mass storage device 1082 includes, but is not limited to, a solid state drive, a hard disk drive, an universal serial bus flash memory drive, or any other form of computer data storage medium. The network interface 1086 is implemented using any type of well-known network interface standard including, but not limited to, an Ethernet interface, a universal serial bus (USB) interface, a Peripheral Component Interconnect (PCI) Express interface, a wireless interface and/or any other suitable type of interface. The wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 10 are depicted as separate blocks within the system 1000, the functions performed by some of these blocks may be integrated within a single semiconductor circuit or may be implemented using two or more separate integrated circuits. The system 1000 may include more than one processor/processing core in another embodiment.

The methods disclosed herein can be implemented in hardware, software, firmware, or any other combination thereof. Although examples of the embodiments of the disclosed subject matter are described, one of ordinary skill in the relevant art will readily appreciate that many other methods of implementing the disclosed subject matter may alternatively be used. In the preceding description, various aspects of the disclosed subject matter have been described. For purposes of explanation, specific numbers, systems and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

The term "is operable" used herein means that the device, system, protocol etc, is able to operate or is adapted to operate for its desired functionality when the device or system is in off-powered state. Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

The techniques shown in the figures can be implemented using code and data stored and executed on one or more computing devices such as general purpose computers or computing devices. Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals— such as carrier waves, infrared signals, digital signals, etc.).

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A processor, comprising:
   a plurality of processing cores,
   frequency dither filter circuitry to determine a maximum limit and a minimum limit based on an occurrence of one or more frequency transitions in a time window,
   power management unit circuitry to,
   check whether the minimum limit is in a non-turbo range,
      if the minimum limit is in the non-turbo range, check whether a requested frequency is greater than the maximum limit and operate the plurality of processing cores at a frequency value represented by the maximum limit if the requested frequency is greater than the maximum limit and operate the plurality of processing cores at the requested frequency if the requested frequency is not greater than the maximum limit,
      if the minimum limit is not in the non-turbo range, determine an average frequency value over a previous time window and check if the average frequency value is closer to the maximum limit,
         if the average frequency value is closer to the maximum limit, check whether the requested frequency is greater than the maximum limit and operate the plurality of processing cores at the frequency value represented by the maximum limit if the requested frequency is greater than the maximum limit and operate the plurality of processing cores at the requested frequency if the requested frequency is not greater than the maximum limit,
         if the average frequency value is not closer to the maximum limit, check whether the requested frequency is less than the minimum limit and operate the plurality of processing cores at a frequency value represented by the minimum limit if the requested frequency is less than the minimum limit and operate the plurality of processing cores at the requested frequency if the requested frequency is less than the minimum limit.

2. The processor of claim 1, wherein the frequency dither filter circuitry is to generate the maximum limit and the minimum limit in response to receiving a first value representing the time window and a second value representing a frequency transitions threshold value.

3. The processor of claim 2, wherein the first value is determined based on an expected responsiveness to changes in workload.

4. The processor of claim 2, wherein the frequency transitions threshold is selected based on tolerable performance losses caused by the occurrence of the frequency transitions.

5. The processor of claim 1, wherein the frequency dither filter circuitry is to,
   receive a new frequency value associated with a frequency transition,
   check whether a maximum limit is to be determined,
   increment a counter value corresponding to the frequency points, which are above the new frequency value if the new frequency value is less than a present value,
   compare the counter value of the frequency points with the frequency transition threshold value if the time window has not elapsed, and
   select a frequency point, which has a counter value equal to the frequency transitions threshold, as the maximum limit.

6. The processor of claim 1, wherein the frequency dither filter circuitry is to,
   receive a new frequency value associated with a frequency transition in the first time window,
   check whether a minimum limit is to be determined,
   increment a counter value corresponding to the frequency points, which are below the new frequency value if the new frequency value is greater than a present value,
   compare the counter value of the frequency points with the frequency transition threshold value if the time window has not elapsed, and
   select a frequency point, which has a counter value equal to the frequency transitions threshold, as the minimum limit.

7. The processor of claim 1 further including multiple domains operable at different frequency levels based on the maximum limit and the minimum limit corresponding to each of the multiple domains.

8. A method in an integrated circuit, comprising:
   checking whether the minimum limit is in a non-turbo range,
      if the minimum limit is in the non-turbo range, checking whether a requested frequency is greater than the maximum limit and operating the plurality of processing cores at a frequency value represented by the maximum limit if the requested frequency is greater than the maximum limit and operating the plurality of processing cores at the requested frequency if the requested frequency is not greater than the maximum limit,
      if the minimum limit is not in the non-turbo range, determining an average frequency value over a previous time window and checking if the average frequency value is closer to the maximum limit,
         if the average frequency value is closer to the maximum limit, checking whether the requested frequency is greater than the maximum limit and operating the plurality of processing cores at the frequency value represented by the maximum limit if the requested frequency is greater than the maximum limit and operating the plurality of processing cores at the requested frequency if the requested frequency is not greater than the maximum limit,
         if the average frequency value is not closer to the maximum limit, checking whether the requested frequency is less than the minimum limit and operating the plurality of processing cores at a frequency value represented by the minimum limit if the requested frequency is less than the minimum limit and operating the plurality of processing cores at the requested frequency if the requested frequency is less than the minimum limit.

9. The method of claim 8 comprises generating the maximum limit and the minimum limit in response to receiving a first value representing the first time window and a second value representing a frequency transitions threshold value.

10. The method of claim 9 the first value is determined based on an expected responsiveness to changes in workload.

11. The method of claim 9, wherein the frequency transitions threshold is selected based on tolerable performance losses caused by the occurrence of the frequency transitions.

12. The method of claim 8 comprises,
receiving a new frequency value associated with a frequency transition,
checking whether a maximum limit is to be determined,
incrementing a counter value corresponding to the frequency points, which are above the new frequency value if the new frequency value is less than a present value,
comparing the counter value of the frequency points with the frequency transition threshold value if the time window has not elapsed, and
selecting a frequency point, which has a counter value equal to the frequency transitions threshold, as the maximum limit.

13. The method of claim 8 comprises,
receiving a new frequency value associated with a frequency transition in the first time window,
checking whether a minimum limit is to be determined,
incrementing a counter value corresponding to the frequency points, which are below the new frequency value if the new frequency value is greater than a present value,
comparing the counter value of the frequency points with the frequency transition threshold value if the time window has not elapsed, and
selecting a frequency point, which has a counter value equal to the frequency transitions threshold, as the minimum limit.

14. The method of claim 8 further includes multiple domains and the multiple domains may be operated at different frequency levels based on the maximum limit and the minimum limit corresponding to each of the multiple domains.

15. A computing system, comprising:
a memory,
a chipset,
a plurality of input-output devices,
a network interface,
a processor, the processor further comprises a plurality of processing cores, a plurality of graphics cores, a frequency dither filter, and a power management unit, wherein the processor to,
check whether the minimum limit is in a non-turbo range,
   if the minimum limit is in the non-turbo range, check whether a requested frequency is greater than the maximum limit and operate the plurality of processing cores at a frequency value represented by the maximum limit if the requested frequency is greater than the maximum limit and operate the plurality of processing cores at the requested frequency if the requested frequency is not greater than the maximum limit,
   if the minimum limit is not in the non-turbo range, determine an average frequency value over a previous time window and check if the average frequency value is closer to the maximum limit,
      if the average frequency value is closer to the maximum limit, check whether the requested frequency is greater than the maximum limit and operate the plurality of processing cores at the frequency value represented by the maximum limit if the requested frequency is greater than the maximum limit and operate the plurality of processing cores at the requested frequency if the requested frequency is not greater than the maximum limit,
      if the average frequency value is not closer to the maximum limit, check whether the requested frequency is less than the minimum limit and operate the plurality of processing cores at a frequency value represented by the minimum limit if the requested frequency is less than the minimum limit and operate the plurality of processing cores at the requested frequency if the requested frequency is less than the minimum limit.

16. The computing system of claim 15 the processor to generate the maximum limit and the minimum limit in response to receiving a first value representing the time window and a second value representing a frequency transitions threshold value.

17. The computing system of claim 16 the first value is determined based on an expected responsiveness to changes in workload.

18. The computing system of claim 16, wherein the frequency transitions threshold is selected based on tolerable performance losses caused by the occurrence of the frequency transitions.

19. The computing system of claim 15 the processor to,
receive a new frequency value associated with a frequency transition,
check whether a maximum limit is to be determined,
increment a counter value corresponding to the frequency points, which are above the new frequency value if the new frequency value is less than a present value,
compare the counter value of the frequency points with the frequency transition threshold value if the time window has not elapsed, and
select a frequency point, which has a counter value equal to the frequency transitions threshold, as the maximum limit.

20. The computing system of claim 15 the processor to,
receive a new frequency value associated with a frequency transition in the first time window,
check whether a minimum limit is to be determined,
increment a counter value corresponding to the frequency points, which are below the new frequency value if the new frequency value is greater than a present value,
compare the counter value of the frequency points with the frequency transition threshold value if the time window has not elapsed, and
select a frequency point, which has a counter value equal to the frequency transitions threshold, as the minimum limit.

21. The computing system of claim 15 further includes multiple domains and the multiple domains may be operated at different frequency levels based on the maximum limit and the minimum limit corresponding to each of the multiple domains.

* * * * *

UNITED STATES PATENT AND TRADEMARK OFFICE
CERTIFICATE OF CORRECTION

| | | |
|---|---|---|
| PATENT NO. | : 9,501,299 B2 | Page 1 of 1 |
| APPLICATION NO. | : 14/306014 | |
| DATED | : November 22, 2016 | |
| INVENTOR(S) | : Nikhil Gupta et al. | |

It is certified that error appears in the above-identified patent and that said Letters Patent is hereby corrected as shown below:

On the Title Page

Item (72), the inventors should read as follows:
--Inventors: Nikhil Gupta, Hillsboro, OR (US); Ameya Ambardekar, Hillsboro, OR (US); Avinash N. Ananthakrishnan, Portland, OR (US); Ian M. Steiner, Hillsboro, OR (US)--

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*